(12) United States Patent
Saito

(10) Patent No.: US 11,281,572 B2
(45) Date of Patent: Mar. 22, 2022

(54) INFORMATION PROCESSING APPARATUS AND MEMORY ACCESS METHOD

(71) Applicant: Sony Interactive Entertainment Inc., Tokyo (JP)

(72) Inventor: Hideyuki Saito, Chiba (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/346,717

(22) PCT Filed: Dec. 13, 2017

(86) PCT No.: PCT/JP2017/044777
§ 371 (c)(1),
(2) Date: May 1, 2019

(87) PCT Pub. No.: WO2018/116937
PCT Pub. Date: Jun. 28, 2018

(65) Prior Publication Data
US 2020/0073793 A1 Mar. 5, 2020

(30) Foreign Application Priority Data

Dec. 20, 2016 (JP) .............................. JP2016-247049

(51) Int. Cl.
*G06F 12/02* (2006.01)
*G06F 3/06* (2006.01)
*G06F 13/16* (2006.01)

(52) U.S. Cl.
CPC .......... *G06F 12/0246* (2013.01); *G06F 3/061* (2013.01); *G06F 3/0659* (2013.01); *G06F 3/0679* (2013.01); *G06F 13/1642* (2013.01)

(58) Field of Classification Search
CPC .... G06F 12/0246; G06F 3/061; G06F 3/0659; G06F 3/0679; G06F 13/1642
See application file for complete search history.

(56) References Cited

U.S. PATENT DOCUMENTS 7,313,031 B2 12/2007 Shiga
8,208,406 B1* 6/2012 Jiang ..................... H04L 47/623
370/255

(Continued)

FOREIGN PATENT DOCUMENTS

JP 2000285082 A 10/2000
JP 2006185198 A 7/2006

(Continued)

OTHER PUBLICATIONS

International Preliminary Report on Patentability and Written Opinion for corresponding PCT Application No. PCT/JP2017/044777, 18 pages, dated Jul. 26, 2018.

(Continued)

*Primary Examiner* — Yaima Rigol
(74) *Attorney, Agent, or Firm* — Matthew B. Dernier, Esq.

(57) ABSTRACT

A host unit of an information processing apparatus has a command issuing block for issuing access requests to a flash memory, the issued commands being dividedly stored in two or more queues according to the contents and emergency level of access. A management command generating block of a flash controller generates requests for the processing necessary for the management of the flash memory, the requests being stored in any one of the queues. Following the rules set for each queue, a command processing block reads commands by switching between the queues and processes the commands.

17 Claims, 10 Drawing Sheets

(56) References Cited

U.S. PATENT DOCUMENTS

| | | | |
|---|---|---|---|
| 8,271,692 B1* | 9/2012 | Dinh | G06F 3/0659 |
| | | | 710/5 |
| 8,271,749 B2* | 9/2012 | Yamaguchi | G06F 3/061 |
| | | | 711/158 |
| 8,688,894 B2 | 4/2014 | Kuehne | |
| 2002/0181484 A1* | 12/2002 | Aimoto | H04L 47/525 |
| | | | 370/413 |
| 2006/0193182 A1 | 8/2006 | Shiga | |
| 2010/0199025 A1 | 8/2010 | Nanjou | |
| 2010/0223423 A1* | 9/2010 | Sinclair | G06F 3/0679 |
| | | | 711/103 |
| 2011/0055458 A1 | 3/2011 | Kuehne | |
| 2011/0161554 A1 | 6/2011 | Selinger | |
| 2012/0066435 A1 | 3/2012 | Colgrove | |
| 2012/0246385 A1* | 9/2012 | Dhandapani | G06F 12/0246 |
| | | | 711/103 |
| 2013/0060981 A1* | 3/2013 | Horn | G06F 3/0659 |
| | | | 710/107 |
| 2013/0254454 A1 | 9/2013 | Ide | |
| 2014/0137128 A1 | 5/2014 | Chang | |
| 2014/0195699 A1* | 7/2014 | Sokol, Jr | G06F 13/37 |
| | | | 710/40 |
| 2014/0281050 A1 | 9/2014 | Vogan | |
| 2016/0011782 A1 | 1/2016 | Kurotsuchi | |
| 2016/0266934 A1 | 9/2016 | Rimoni | |
| 2017/0060427 A1* | 3/2017 | Shen | G06F 3/061 |
| 2017/0075574 A1* | 3/2017 | Oikawa | G06F 12/0238 |
| 2017/0315908 A1* | 11/2017 | Yang | G06F 3/0608 |
| 2018/0173430 A1* | 6/2018 | Kanno | G06F 12/0246 |
| 2018/0217951 A1* | 8/2018 | Benisty | G06F 13/1642 |
| 2018/0335976 A1* | 11/2018 | DeRosa | G06F 3/0673 |

FOREIGN PATENT DOCUMENTS

| | | |
|---|---|---|
| JP | 2006236056 A | 9/2006 |
| JP | 2013200692 A | 10/2013 |
| TW | 506431 B | 11/2015 |
| TW | 551989 B | 10/2016 |
| WO | 2014132346 A1 | 9/2014 |

OTHER PUBLICATIONS

Extended European Search Report for corresponding EP Application No. 17883337.2, 10 pages, dated Jul. 3, 2020.
International Search Report for corresponding PCT Application No. PCT/JP2017/044777, 4 pages, dated Jan. 16, 2018.
Office Action for corresponding TW Application No. 106136823, 11 pages, dated Sep. 10, 2018.
Grant of Paten for corresponding KR Application No. 10-2019-7016557, 4 pages, dated Apr. 5, 2021.

* cited by examiner

FIG. 4

| PHASE | QUEUE TYPE | | PROCESSING UPPER LIMITS | TIME LIMIT | MAXIMUM REQUIRED TIME |
|---|---|---|---|---|---|
| | NSID | PROCESSING CONTENTS | | | |
| 1 | b | READ | 50 | — | 5.1msec |
| 2 | a~c | FAST WRITE STANDARD READ/WRITE | WRITE: 1 READ: 4 | — | 0.5msec |
| 3 | BG Job | READ | 3 | — | 0.4msec |
| 4 | b | READ | 50 | — | 5.1msec |
| 5 | BG Job | WRITE, DELETE | WRITE: 1 | 3.0msec | 3.0msec |
| TOTAL | | | | | 14.1msec |

INFORMATION PROCESSING APPARATUS AND MEMORY ACCESS METHOD

TECHNICAL FIELD

The present technology relates an information processing apparatus and a memory access method that are configured to access a flash memory.

BACKGROUND ART

With the increase in the capacity of the NAND-type flash memory, the solid state drive (SSD) has come to be used as a storage device that replaces the prior-art hard disk drive (HDD). As compared with the HDD, the SSD has properties that the SSD is advantageous in that data access can be done at higher speeds and lower power dissipation at the costs of the lower durability in repetitive data read/write operations. Therefore, a data rewrite operation on the SSD requires the processing of distributing regions subject to data rewrite operations. For example, if a rewrite request comes from the host central processing unit (CPU), a specified logical block address is replaced with a different physical address, thereby distributing the data to be rewritten to as many memory cells as possible (refer to PTL 1 below, for example).

CITATION LIST

Patent Literature

[PTL 1] WO 2014/132346 A1

SUMMARY

Technical Problems

As described above, since the SSD is enabled to access at high speeds, the capacity of the system memory can be reduced by reading lots of pieces of data necessary for information processing on an on-demand basis. On the other hand, the increase in access frequency as a result of the above-mentioned reading makes conspicuous the problems in management processing unique to the SSD. The management processing includes the following, for example. Since the NAND-type flash memory is disabled for overwriting, in a case where data are written to various regions as described above, it is necessary to copy the data to continuous regions at a given stage and delete the data in empty regions in preparation for later writing.

In addition, it is also required to save data to other regions at a given stage in preparation for the possibility that the device charge leakage occurs due to repeated reading, thereby resulting in data destruction. Further, since writing is executed at high speeds, it is also practiced that, by using the single level cell (SLC) for recording one bit per one memory cell as a cache, data is stored again in the triple level cell (TLC) in which three bits can be recorded per one memory cell with a later timing. If these management processing operations are prioritized over a request from the host CPU, an non-ignorable delay time may occur in the information processing. On the other hand, unless the management processing is done with a proper timing, a request from the host CPU may be not processed.

Therefore, the present invention addresses the above-identified and other problems associated with related-art methods and apparatuses and solves the addressed problems by providing a technology can stably execute the information processing using the SSD while reducing a delay time for memory access.

Solution to Problems

In carrying out the present invention and according to one aspect thereof, there is provided an information processing apparatus including: a command accepting block configured to accept an access request from a host processor to a memory; and a command processing block configured to read the access request from any one of a plurality of queues in which the access request is stored in a sorted manner, in which the command processing block switches a request read destination queue among the plurality of queues to a next queue with a timing in accordance with a rule set for each of the queues.

In carrying out the present invention and according to another aspect thereof, there is provided a memory access method including: a step of accepting an access request from a host processor to a memory; a step of reading the access request from any one of a plurality of queues in which the access request is stored in a sorted manner; and a step of executing the access request that was read, in which the step of reading switches a request read destination queue among the plurality of queues to a next queue with a timing in accordance with a rule set for each of the queues.

Incidentally, if other combinations of the above-outlined composing elements or the above expressions of the present invention are converted between different forms such as a method, an apparatus, a system, a computer program, and a recording medium that records a computer program, they still constitute effective embodiments of this invention.

Advantageous Effect of Invention

According to the present invention, the information processing using the SSD can be executed with stability while reducing a delay time for memory access.

BRIEF DESCRIPTION OF DRAWINGS

FIG. 4 is a diagram illustrating a setting example of the types of queues to be processed in each phase, the processing upper limits of commands in each phase, and time limits in the present embodiment.

DESCRIPTION OF EMBODIMENTS

Figure 1:
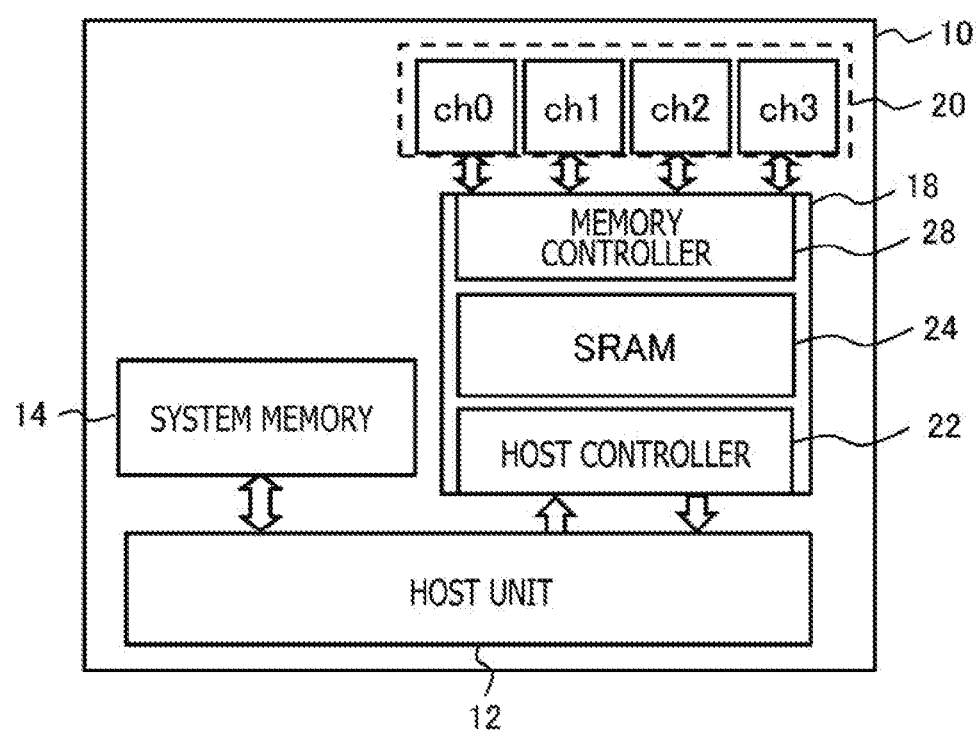
FIG. 1 is a diagram illustrating a circuit configuration of an information processing apparatus in the present embodiment.

Now, referring to FIG. 1, there is illustrated a circuit configuration of an information processing apparatus of the present embodiment. Here, the information processing apparatus in this example may be any one of a portable game machine, a personal computer, a mobile telephone, a table terminal, a personal digital assistant (PDA), and other general-purpose information devices. The information processing apparatus 10 has a host unit 12 including a CPU, a system memory 14, a NAND-type flash memory 20 (hereafter referred to simply as a flash memory 20), and a flash controller 18.

The host unit 12 loads programs and data stored in the flash memory 20 into the system memory 14 so as to execute information processing by use of these programs and data. In addition, the host unit 12 reads application programs and data from a recording medium driven in a recording medium driving block not illustrated or downloads application programs and data from a server network-connected by a communication block into the flash memory 20. At this moment, the host unit 12 issues an access request to the flash controller 18 for accessing the flash memory 20 and, in response thereto, the flash controller 18 executes read/write processing on the flash memory 20.

The flash memory 20 is connected with two or more NAND-type flash memories so as to store data in two or more channels ("ch0" through "ch3" in the diagram) in a distributed manner as illustrated. The flash controller 18 has a host controller 22 having an interface function for interfacing the host unit 12, a memory controller 28 having an interface function for interfacing the flash memory 20, and a static random access memory (SRAM) 24.

The host unit 12 generates an access request for accessing the flash memory 20 in accordance with the progress of information processing and stores the generated access request in the system memory 14. This access request includes a logical address (LBA: Logical Block Address) of the access destination. The host controller 22 of the flash controller 18 reads the access request stored in the system memory 14 and converts the LBA into a physical address of the flash memory 20. At this moment, for an address conversion table required for this conversion, at least a part of an address table originally stored in the flash memory 20 is developed into the SRAM 24 in advance.

By referencing this address conversion table, the host controller 22 supplies the physical address obtained on the basis of the LBA to the memory controller 28. By accessing a corresponding region in the flash memory 20 on the basis of this physical address, the memory controller 28 reads or writes data. The data to be written has been stored in the system memory 14 by the host unit 12 and is read by the memory controller 28. The read data is stored in the system memory 14 by the memory controller 28 for the host unit 12 to read.

Generally, a data read/write operation on the flash memory 20 is executed on an access basis in 4096 bytes or the like. In a case where the NAND-type flash memory is use, data overwrite is disabled, so that, in writing data, it is required to allocate a region in which nothing is written. As described above, if data update is repeated by changing only logical addresses so as to distribute write regions, the number of regions in which invalidated original data are stored increases, eventually resulting in the shortage of regions in which data can be newly written.

Since data is deleted on a block basis of several MiBs (1 MiB=$10^{20}$ bytes), the allocation of regions in which nothing is written requires to copy the valid data stored in a block to be deleted to another block and then delete the entire data in the original block. This processing is generally referred to as "garbage collection." That is, the memory controller 28 is required to execute garbage collection at or before the depletion of the regions in which data can be written in the flash memory 20.

Further, the NAND-type flash memory causes a data failure due to charge leakage. This charge leakage is accelerated by the voltage application at reading of data. The memory controller 28 generally has an error correction function to correct such defective data; however, if a read operation is executed highly frequently, an error ratio may exceed the correction performance, eventually leading to data loss. Such a failure is generally referred to as "read disturb."

Since a read operation is executed by applying voltage to other than a target data region, repeating a read operation on a same block causes a failure on the entire block. Therefore, when the number of times a same block has been read reaches a predetermined value, the memory controller 28 saves the data in the entire block concerned to another block, thereby recharging the leaked charges.

Further, the NAND-type flash memory includes the TLC that records data of three bits per one memory cell by providing eight stages by setting a threshold value to the quantity of charge amount to be accumulated. However, since the TLC requires a complicated write sequence as compared with the SLC that records data of one bit per one memory cell based on the quantity of charge amount of two stages, write processing takes time. Therefore, a part of the flash memory 20 is allocated in advance as an SLC region which is used as a cache, thereby increasing the speed of write processing. At this moment, the memory controller 28 copies the data written to the SLC to the TLC with a proper timing separate from the execution of a write request.

Thus, it is necessary for the memory controller 28 to execute the management processing unique to the NAND-type flash memory separately from a request from the host unit 12. Once the necessity for executing management processing occurs, normal data read/write processing must be put in a wait state for a comparatively long time until this management processing is completed. As a result, a delay not ignorable for information processing may occur or the throughput of the entire processing may be remarkably lowered. In a mode where the data stored in the flash memory 20 is frequently read so as to draw a display image, the frequency of management processing increases as the number of accesses increases, so that problems may become conspicuous along with the strictness of a time limit up to the display of an image.

Therefore, in the present embodiment, while properly keeping the balance in execution frequency between the data read/write processing and the management processing necessary for information processing and executing both the processing operations without failure, the delay of the information processing is minimized. To be more specific, the management processing as described above and an access request from the host unit 12 are sorted by the contents of processing and the sorted management processing and access request are stored in different queues. Then, by switching between the target queues by the rules unique to the type of processing contents, the processing to be executed with certainty is achieved with an absolute scale.

Further, by determining the queue switching rules on the basis of the causal relation between the frequency of the processing of an access request from the host unit 12 and the frequency with which the necessity of management processing occurs, the balance between both frequencies is optimized and the estimation of required time and bandwidth is facilitated. In what follows, a processing request for management processing and an access request from the host unit 12 may be generically referred to as "a command."

Figure 2:
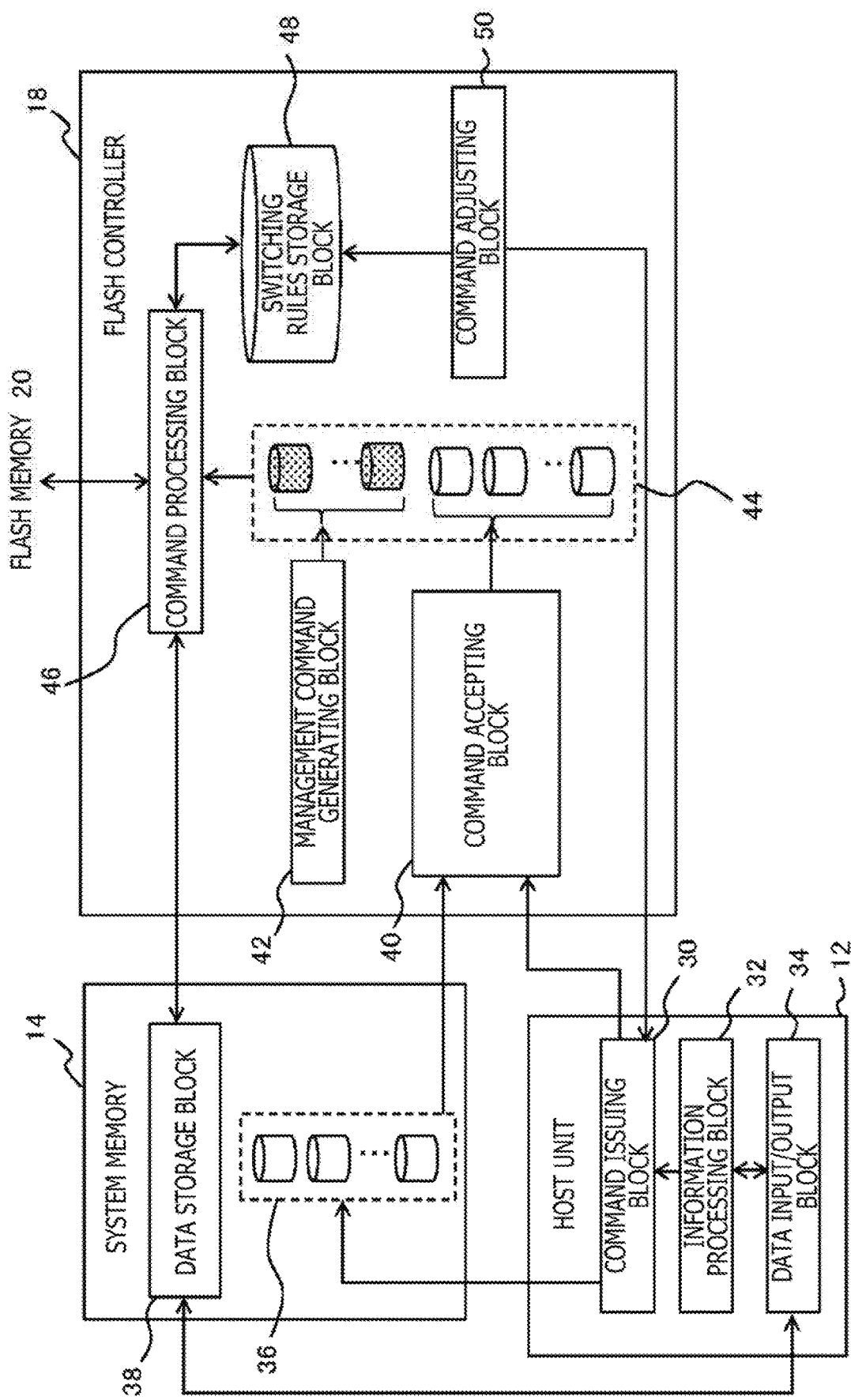
FIG. 2 is a diagram illustrating a configuration of functional blocks of the information processing apparatus in one embodiment.

Referring to FIG. 2, there is illustrated a configuration of functional blocks of the information processing apparatus in the present embodiment. Each of the functions illustrated in FIG. 2 can be realized by a circuit configuration illustrated in FIG. 1 in terms of hardware; in terms of software, each function is realized by programs stored in an internal memory. Therefore, it would be understood by those skilled in the art that each function can be realized by only hardware, only software, or a combination thereof and therefore not restricted to a particular one thereof.

The host unit 12 has a command issuing block 30 configured to issue commands for accessing the flash memory 20, an information processing block 32 configured to process application programs and so on, and a data input/output block 34 configured to input/output data to be read or written from or to the flash memory 20. The system memory 14 has two or more queues 36 configured to store commands issued from the host unit 12 and a data storage block 38 configured to store data to be read or written to or from the flash memory 20.

The flash controller 18 has a command accepting block 40 configured to acquire, from the host unit 12, a notification that a command has been issued, a management command generating block 42 configured to generate commands for managing the flash memory 20, two or more queues 44 configured to store commands including management commands, a command processing block 46 configured to sequentially processing commands stored in the queues 44, a switching rules storage block 48 configured to store the rules of switching between the queues subject to processing, and a command adjusting block 50 configured to adjust a ratio of the execution of management processing by a predetermined method.

The information processing block 32 of the host unit 12 processes user-selected programs such as applications. In this process, if a demand occurs for reading the data stored in the flash memory 20 or write data to the flash memory 20, the information processing block 32 notifies the command issuing block 30 thereof. In response, the command issuing block 30 specifies the logical address of the access destination and issues a read or write command.

In detail, a command is stored in any one of the two or more queues 36 of the system memory 14 and a notification thereof is sent to the flash controller 18. At this moment, the command issuing block 30 sorts the commands on the basis of the degree of emergency in addition to the contents of access such as a read request or a write request, thereby storing the sort result into the corresponding queue. Therefore, the rules of command sorting based on access contents, time limit, and access data size and the address information of the corresponding queue are set in advance by a program, for example, that is processed by the information processing block 32.

In a case where a command is a write request, the data input/output block 34 acquires the data to be written from the information processing block 32 and stores the acquired data into the data storage block 38 of the system memory 14. In addition, the data input/output block 34 reads the data read from the flash memory 20 by the flash controller 18 from the data storage block 38 and supplies this data to the information processing block 32.

The command accepting block 40 of the flash controller 18 accepts, from the host unit 12, a notification that a command has been issued, reads the command from the corresponding queue in the system memory 14, and then stores the command into the corresponding one of the two or more queues 44 held inside. The queues 44 held in the flash controller 18 include two or more queues having substantially the same configuration as that of the two or more queues 36 inside the system memory 14. Alternatively, the queues 36 inside the system memory 14 may be configured to be referenced as a part of the queues 44.

Whenever the above-mentioned garbage collection, data copy for avoiding read disturb, data copy from SLC to TLC, and other management processing operations are required, the management command generating block 42 issues the commands for demanding these processing operations. In detail, the management command generating block 42 monitors the situations of data writing and data reading to and from the flash memory 20 so as to determine the timings with which to issue management processing commands. The decision rules are set in advance for each of the contents of management processing.

Next, a command specifying processing contents, data copy-source address, data copy-destination address, a block to be data-deleted, and so on is stored in one of the queues for management processing of the queues 44 that corresponds to the processing contents. It should be noted that, in the diagram, of the queues 44, the queues in which the commands issued by the host unit 12 are stored are indicated white, while the queues in which the commands issued by the management command generating block 42 are stored are indicated in mesh for distinction.

The command processing block 46 sequentially processes the commands stored in the queues 44. At this moment, the commands stored in one queue are processing on a first-in, first-served basis. Further, the command processing block 46 switches the queues subject to processing to a next queue in accordance with the switching rules set for each queue. That is, it is possible that the commands stored in another queue are processed in a sequence different from the sequence of issue. The queue switching rules are stored in the switching rules storage block 48 in advance for the reference by the command processing block 46.

In a case where a command read from a queue is a write request, the command processing block 46 reads the data to be written from the data storage block 38 of the system memory 14 and writes this data to the region corresponding to a logical address included in the command. In a case where the command is a read request, the command processing block 46 stores the data read from the region corresponding to the logical address included in the command into the data storage block 38 of the system memory 14. In a case where the command is a data move inside the flash memory 20, the command processing block 46 copies the data from the copy-source address to the copy-destination address included in the command. An addition, the command processing block 46 deletes, as required, the data in the block from which the data was copied.

The command adjusting block 50 adjusts the ratio of the processing to be executed so as to prevent memory access from failing due to incomplete management processing. For example, when the number of commands for management processing stored in the queues 44 exceeds a predetermined threshold value, at least a part of the queue switching rules stored in the switching rules storage block 48 is temporarily changed and a notification thereof is sent to the host unit 12.

In the former, the upper limit of the time limit or the number of command processing operations that are set as rules for switching from a queue in which the commands for management processing are stored to another queue is increased or the upper limit of the number of command processing operations in another queue is decreased. This arrangement allows the increase in the ratio with which management processing is substantially executed. When the number of commands for executing the management processing stored in the queues 44 gets equal to or lower than the above-mentioned threshold value, the queue switching rules are returned to the original state.

In sending a notification to the host unit 12, the command issuing block 30 of the host unit 12 receives the notification and restricts command issue. For example, the issue of commands low in emergency is temporarily paused or the frequency of issue is restricted to a level equal to or lower than a predetermined value. This arrangement also substantially increases the ratio of the execution of management processing. It should be noted that the change of queue switching rules and the notification to the host unit 12 may be done at timings other than those mentioned above.

For example, since the necessity of the processing for avoiding garbage collection and read disturb can be forecast by the situation of memory access done so far, the measures against these problems can be taken in advance. To be more specific, when the number of writable blocks gets equal to or lower than a predetermined threshold value, it is determined that a garbage collection command will be issued soon. Obviously, the threshold value to be used here is greater than the threshold value to be used at actually issuing a garbage collection command.

Alternatively, when the number of times read processing is executed on a same block has reached a predetermined threshold value, it is determined that a data copy command for avoiding read disturb will be issued soon. Obviously, the threshold value to be used here is smaller than the threshold value at the time of actually issuing a data copy command. Then, changing the queue switching rules or sending a notification to the host unit 12 with these timings allows the restriction of an adjustment amount because of the adjustment in advance.

Regularly notifying the host unit 12 of the number of writable blocks and the number of times read processing is executed on a same block may gradually restrict the issue of commands by the host unit 12. Further, taking measures for changing the queue switching rules and the notification to the host unit 12 may be executed independently or simultaneously. This adjustment processing allows the proper maintenance of the balance between the processing of an access request from the host unit 12 and the management processing required by the flash memory 20 itself and the assurance of a low delay for the processing of highly emergent commands.

Figure 3:
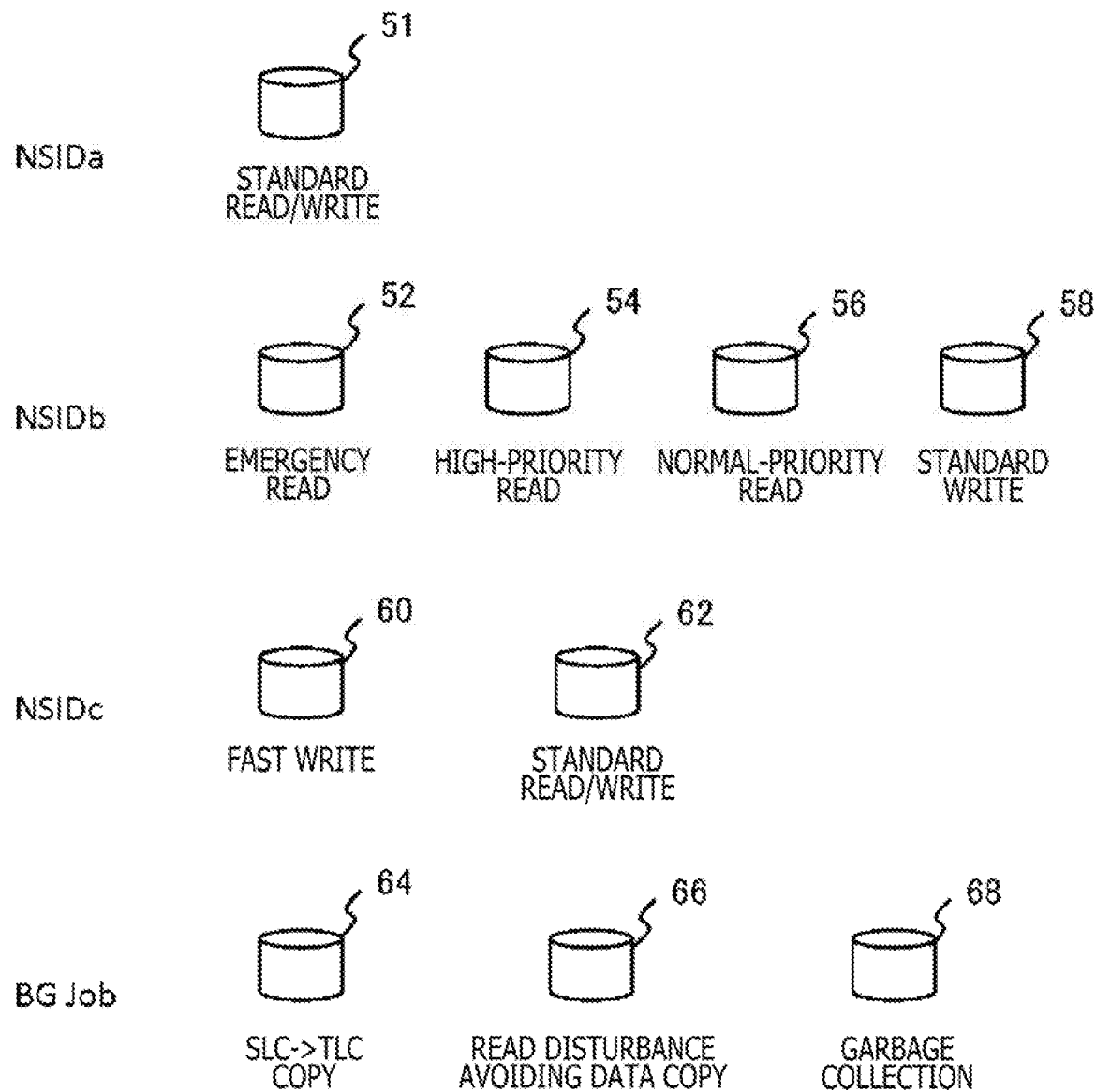
FIG. 3 is a diagram illustrating a configurational example of a queue in the present embodiment.

Referring to FIG. 3, a configurational example of the queues 44 is schematically illustrated. Here, each cylinder is schematically indicative of a queue, immediately below which the type of a command to be stored in the queue is indicated. The flash memory 20 is divided into logical partitions having different name spaces (NS: Name Space) that are exclusively accessed. The queue is also arranged for each of these partitions; in the diagram, the queues to be arranged for the name spaces of identification codes, a, b, and c ("NSIDa," "NSIDb," and "NSIDc") are indicated from up to down. Further, at the bottom, queues to be arranged for "BG Job" (Background Job) indicative of management processing are indicated.

In this example, "NSIDa" is a partition that is accessed by an ordinary file system and has a queue 51 in which a standard read command and a standard write command are stored together. "NSIDb" is a partition for handling a read-only file archive; if a file is written once by use of a queue 58 dedicated to write commands, data is read by use of the queues 52, 54, and 56 dedicated to read commands.

Here, the queues dedicated to read commands are configured by two or more queues in accordance with the degree of emergency; in the diagram, three stages are arranged, namely, the queue 52 of the highest emergency "EMERGENCY," the queue 54 of the next highest emergency "HIGH PRIORITY," and the queue 56 of the lowest emergency "NORMAL PRIORITY." However, the number of stages is not limited to these three. Further, the queue 58 dedicated to write commands is a standard queue having approximately a same priority as that of the queue 51 of "NSIDa."

"NSIDc" is a partition configured by the SLC and has a fast-write-only queue 60 and a queue 62 in which a read command and a write command are stored together. The latter is a standard queue having approximately a same priority as that of the queue 51 of "NSIDa."

For the "BG Job," as described above, a queue 64 for a command for copying data from the SLC to the TLC, a queue 66 for a data copy command for avoiding read disturb, and a queue 68 for a garbage collection command are arranged. In addition, a queue for storing system management commands, for example, may be arranged separately from the above-mentioned management processing that must be executed in the background during operation as described above.

As described above, the command processing block 46 of the flash controller 18 sequentially processes the commands stored in the queues while switching between these queues in accordance with the rules stored in the switching rules storage block 48. In detail, the queues 51 through 68 themselves are divided into two or more types to which a processing interval is allocated for cycling. In an interval in which a queue of a certain type is subject to processing, when the number of command processing operations has reached the upper limit or the time limit has been expired, the transition to an interval in which a queue of a next type is subject to processing is done. The number of processing upper limits and the time limit can be set independently of each of the types. In what follows, the interval allocated to each type of queue is referred to as a "phase."

Referring to FIG. 4, there is illustrated a setting example of the types of queues to be processed in each phase, the processing upper limits of commands in each phase, and time limits. In this example, there are provided five phases, phase 1 through phase 5 that are cycled from phase 1, to phase 2, to phase 3, to phase 4, to phase 5, to phase 1, to phase 2, and so on, and are transitioned. First, in phase 1, the read-only queues for NSIDb, namely, the three queues 52, 54, and 56 in the example illustrated in FIG. 3, are subject to processing. Of these queues, those which are high in emergency are preferentially subject to processing. The command processing upper limit is 50 here. It should be noted that the number of commands is counted by using the access to the data of a predetermined size as one unit. This holds with the description below.

In phase 2, the fast-write-only queues for NSIDc, a standard read/write queue for NSIDa and NSIDc and a standard write-only queue for NSIDb are subject to processing. In FIG. 3, these queues correspond to the queues, 60, 51, 62, and 58, respectively. Of these queues, if a command is stored in the fast-write-only queue 60, the fast write to the SLC can be realized by prioritizing this command.

In phase 3, "BG Job," namely the queues for management processing (the queues 64, 66, and 68 in the example illustrated in FIG. 3) are subject to processing. Any one of the commands stored in these queues includes the processing of moving the data already stored in the flash memory 20 to another region; in phase 3, these commands execute only a part of this processing, namely, the reading of the original data. The data that has been read is temporarily stored in an internal memory or the system memory 14.

In phase 4, as with phase 1, the read-only queue for NSIDb is subject to processing. Diving the processing for the same queue into two intervals allows the processing of a command issued immediately after the end of the preceding interval promptly in the next interval, thereby reducing a maximum delay time. In phase 5, "BG Job," namely, of the commands stored in the management processing queues, the write of the data read in phase 3 and the delete of the data invalidated by copy are executed.

For example, in drawing a display image at a predetermined frame rate by use of the data stored in the NSIDb, a screen may be frozen or dropped due to the delay in that data read. Since each command stored in the management processing queue requires a long time for the completion of the processing, the processing may be divided into two stages in phase 3 and phase 5, thereby preventing the processing requiring realtime, such as the drawing of a display image, from being hampered.

Further, as compared with data read or the write to the SLC, the write to the TLC and the data delete require a time that is several times longer. Therefore, the latter is summed up as phase 5 and, at the same time, a time limit is arranged, thereby enabling the transition to another phase by pausing the processing even if the processing is going on. In the example illustrated in the diagram, the time limit of phase 5 is set to "3.0 msec." In addition to the arrangement of the time limit, the processing of phase 5 may be discontinued upon storing a command into a queue high in emergency, such as the queue 52 for emergency read illustrated in FIG. 3, for example.

Consequently, as described above, in the mode in which a display image is drawn by use of the data read from the NSIDb, the influence on the display image can be minimized. It should be noted that, in a case where the processing in phase 5 is discontinued, phase 2 and phase 3 may be skipped for phase transition until the discontinued processing is completed.

FIG. 4 also illustrates the processing upper limit of the number of commands to be given to each phase and the maximum required time assumed therefrom. In phase 1 and phase 4, the data read from the NSIDb is processing with "50" commands being the upper limit. If the read processing takes 100 µsec per command and another processing requires 100 µsec, then, the required time of phase 1 and phase 4 is maximum 5.1 msec. In phase 2, the write to the NSIDa through NSIDc is processed with a "1" command and the read is processed with "4" commands as the upper limit.

If the processing of write to the SLC to be executed here is 500 µsec per command and the processing of read is 100 µsec per command, and another processing is 100 µsec as with described above, then the required time of phase 2 is maximum 0.5 msec for both the write processing and the read processing. In phase 3, the read of data from the copy source is processed with "3" commands being the upper limit. If the read processing takes 100 µsec per command and another processing takes 100 µsec as with described above, then the required time of phase 3 is maximum 0.4 msec.

In phase 5, the write of data to the copy destination is processed with "1" command being the upper limit. The data delete in the invalidated region is restricted with time limit "3.0 msec" as described above to be gradually progressed. If a restriction as described above is given, the processing for one cycle from phase 1 to phase 5 is maximum 14.1 msec, thereby allowing the restriction of the delay time for memory access to a level equal to or lower than a constant value. In addition, the bandwidths necessary for the flash memory 20 and the flash controller 18 can be controlled to a level equal to or lower than a predetermined value.

In the example illustrated in the diagram, in a case where the data size per command is 65536 B (bytes), during an interval of 14.1 msec, the read processing for maximum 100 commands is executed in phase 1 and phase 4, so that the necessary bandwidth is 65536×100/14.1=465 MB/sec per NAND channel Likewise, the bandwidth necessary for the commands to be processed in phase 2 is 18.6 MB/sec for read processing and 4.65 MB/sec for write processing per NAND channel. It should be noted that the numeric values and settings described above are illustrative only and therefore may be changed in accordance with the contents of information processing and the processing performance.

Figure 5:
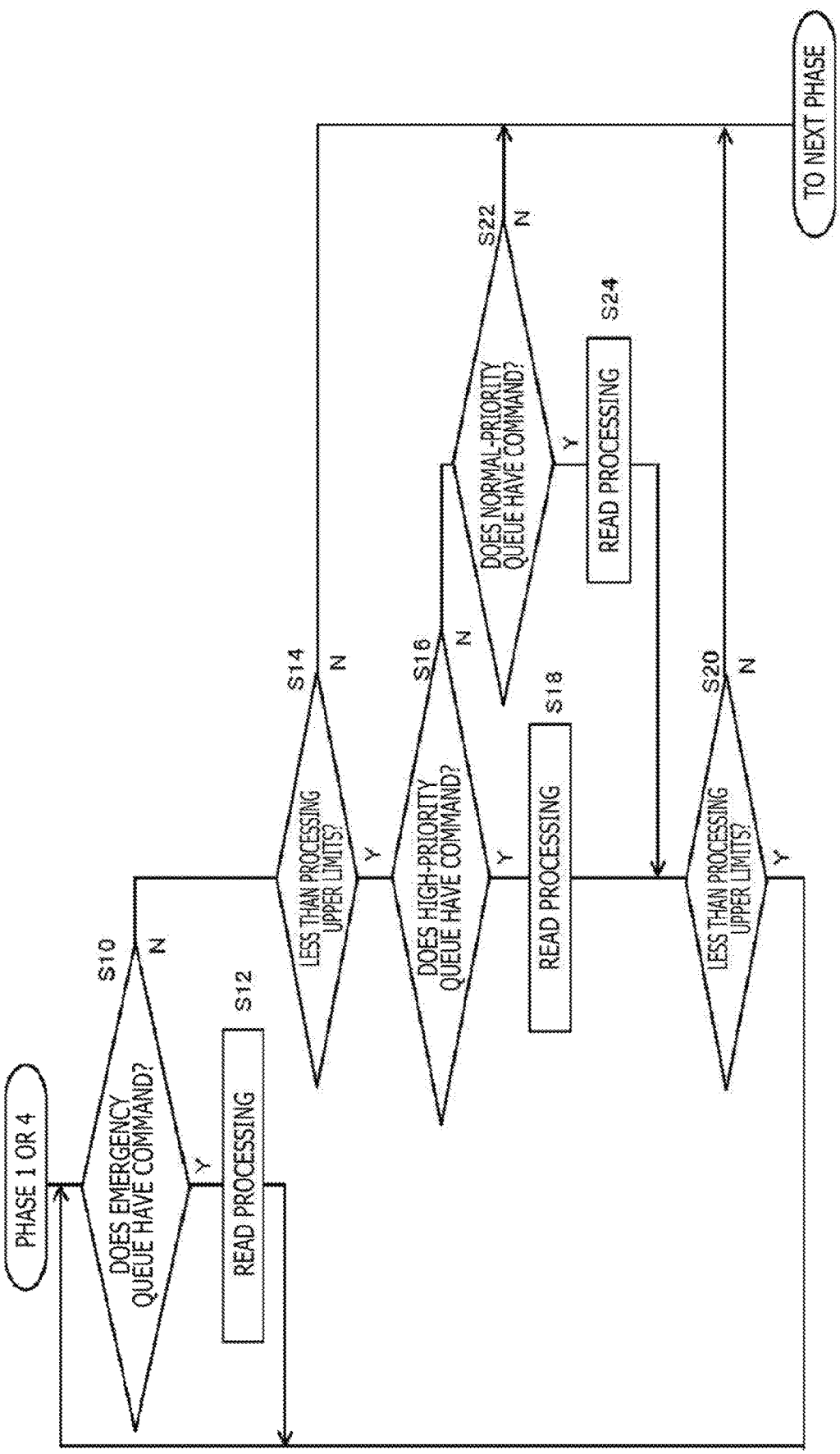
FIG. 5 is a flowchart indicative of a procedure of processing operations in which a command processing block in the present embodiment reads data in phase 1 and phase 4.

Referring to FIG. 5, there is illustrated a flowchart indicative of a procedure of the processing of reading data from the NSIDb by the command processing block 46 in phase 1 and phase 4. This example assumes a case in which the read-only queues are classified into three in accordance with the degree of emergency as illustrated in FIG. 3. First, it is checked whether or not commands are stored in the queue of the highest emergency (the emergency read queue 52 illustrated in FIG. 3) (S10). In a case where commands are stored (Y of S10), the command processing block 46 reads the command first stored in the queue concerned and then reads the data in this region by converting the logical address into the physical address, for example (S12).

As long as commands are stored in a queue of the highest emergency, these commands are sequentially read to be processed (Y of S10, S12). If there is no command to be processed in the queue concerned (N of S10) and the number of commands processed so far is below the processing upper limit (Y of S14), then it is checked whether or not commands are stored in the queue of the next highest emergency (the read queue 54 of high priority illustrated in FIG. 3) (S16). In a case where commands are stored (Y of S16), the command processing block 46 reads the command first stored in the queue concerned and then reads the data in the similar manner as described above (S18).

If the processing upper limit setting cannot be reached by the above-mentioned processing (Y of S20), the command processing block 46 checks again, every time one command is processed, whether or not commands are stored in the queue of the highest emergency queue and, if commands are stored, processes these commands (Y of S10, S12). If there is no command to be processed in the queue of the highest emergency (N of S10) and the number of commands processed so far is below the processing upper limit setting (Y of S14), then the commands stored in the queue of the next highest emergency are processed (Y of S16, S18). If there is not command to be processed in the queue concerned (N of S16), then it is checked whether or not commands are stored in the queue of the lowest emergency (the normal priority read queue 56 illustrated in FIG. 3) (S22).

In a case where commands are stored (Y of S22), the command processing block 46 reads the command first stored in the queue concerned and then reads the data in the same manner as described above (S24). If the processing upper limit setting cannot be reached by the above-mentioned processing (Y of S20), the command processing block 46 checks again, every time one command is processed, whether or not commands are stored in the queue of the highest emergency queue and, if commands are stored, processes these commands (Y of S10, S12). If the number of times commands have been processing reaches the upper limit in any of these cycles (N of S14 or N of S20) or if there is no more command to be processed (N of S22), then this phase is terminated to transition to the next phase.

The processing procedure as described above allows the monitoring of the queues higher in emergency more frequently and, at the same time, the processing of the commands stored in such queues, thereby minimizing a delay time from the storage of commands to the processing thereof. In addition, for the commands comparatively low in emergency, the processing can be executed later with the upper limit of the number of processing operations being a constraint condition so as to transition to another phase, thereby controlling the required time and the bandwidth throughout the phases.

Figure 6:
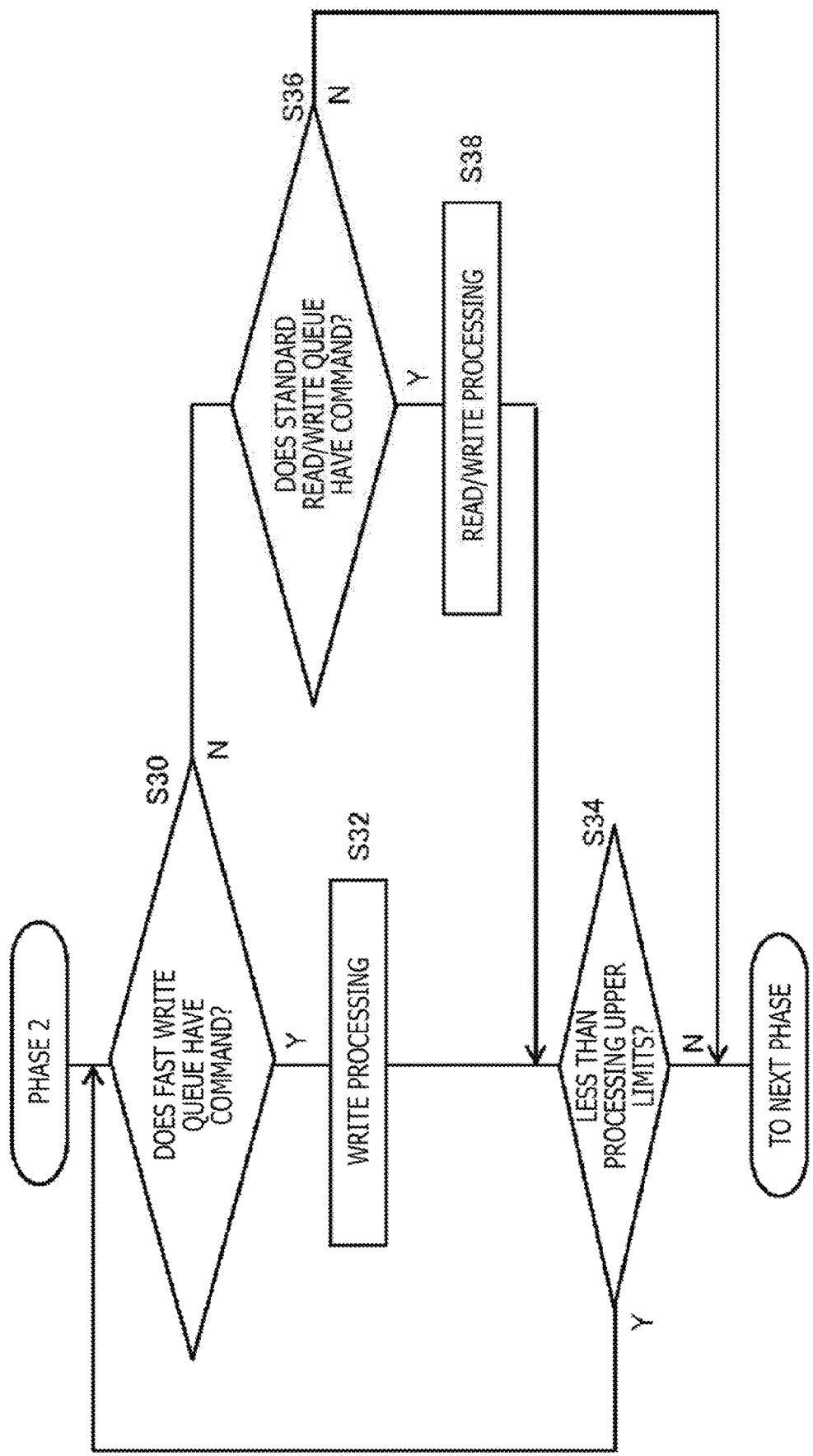
FIG. 6 is a flowchart indicative of a processing procedure in which the command processing blocks in the present embodiment reads or write data in phase 2.

Referring to FIG. 6, there is illustrated a flowchart indicative of a processing procedure for data read and write on NSIDa through NSIDc by the command processing block 46 in phase 2. The command processing block 46 first checks whether or not commands are stored in the queue for fast write to the NSIDc (the fast write queue 60 illustrated in FIG. 3) (S30). In a case where commands are stored (Y of S30), the command processing block 46 reads the command first stored in the queue concerned, converts the logical address to the physical address, and writes the data read from the system memory 14 to the region concerned (S32).

If the number of processed commands has reached the setting of the upper limit of write processing, the phase concerned is terminated to transition to the next phase (N of S34). According to the setting of the number of processing upper limits illustrated in FIG. 4, one command is the upper limit for the write in phase 2, so that executing the processing of S32 once terminates this phase. In the other settings, if the number of processed commands is below the upper limit setting of write processing (Y of S34), then it is checked again whether or not commands are stored in the fast write queue and, if commands are stored, processes these commands (Y of S30, S32).

When the upper limit of write processing has been reached in the repetition of the above-mentioned processing, then the phase concerned is terminated, transitioning to the next phase (N of S34). If there is no more command stored in the fast write queue (N of S30), then it is checked whether or not commands are stored in any one of the standard read or write queues for NSIDa through NSIDc (the standard read/write queues 51 and 62 and the standard write queue 58 illustrated in FIG. 3) (S36).

In a case where commands are stored (Y of S36), the command processing block 46 reads the command first stored in the queue concerned and executes data read/write processing in the same manner as described above (S38). In phase 2, the processing upper limit is set to each of read processing and write processing, so that, every time one command is processed, the number of commands is compared with the upper limit for each of the contents of this processing. If the number of processing operations has not been reached (Y of S34), it is checked again whether or not commands are stored in the fast write queue and, if commands are stored, these commands are processed (Y of S30, S32).

If there is no more command to be processed in the queue concerned (N of S30), then it is checked whether or not commands are stored in the standard read or write queue and, if commands are stored, these commands are processed (Y of S36, S38). If the number of processed commands has reached the upper limit in the cycle concerned or there is no more command to be processed, the phase concerned is terminated to transition to the next phase (N of S34 or N of S36). By the processing procedure as described above, fast write can be preferentially processed. It should be noted that the number of queues subject to check processing in S36 is three in the example illustrated in FIG. 3; basically, however, the round-robin scheme may be employed in which these queues are sequentially checked and, if commands are stored, these commands are processed.

Figure 7:
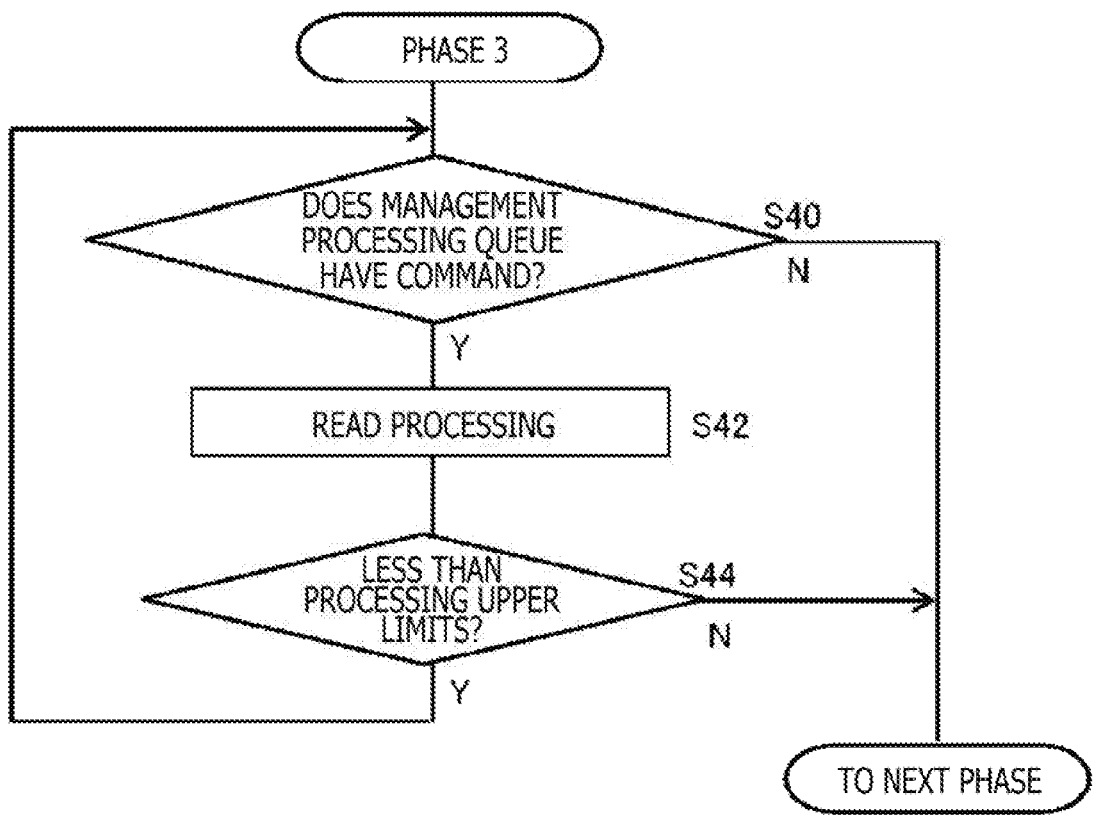
FIG. 7 is a flowchart indicative of a processing procedure in which the command processing block in the present embodiment executes read processing among the management processing operations in phase 3.

Referring to FIG. 7, there is illustrated a flowchart indicative of a processing procedure in which the command processing block 46 executes read processing among the management processing operations in phase 3. The command processing block 46 checks whether or not commands are stored in any one of the queues arranged for management processing (the SLC-to-TLC copy queue 64, the read disturb avoid data copy queue 66, and the garbage collection queue 68 illustrated in FIG. 3) (S40). In a case where commands are stored (Y of S40), the command processing block 46 reads the command first stored in the queue concerned and executes only the processing of reading data (S42).

If the number of processed commands is below the upper limit set in phase 3, then as long as there remain commands in the queue, the processing of reading these commands is repeated (Y of S44, Y of S40, S42). When the upper limit of the processing has been reached (N of S44) or if there is no more command to be processed in any one of the queues (N of S40), the phase concerned is terminated to transition to the next phase. It should be noted that the number of queues subject to check processing is plural (three in the example illustrated in FIG. 3) in S40; basically, however, the round-robin scheme may be employed in which these queues are sequentially checked and, if commands are stored, these commands are processed.

Further, in phase 3, instead of setting the upper limit of the number of processing operations in an absolute value, only the processing operations for executing write in phase 5 may be read. Further, in a case where the free region of the size of the SLC gets smaller than a predetermined size, the command for write to the SLC in phase 2 may be skipped to transition to phase 3, thereby processing the data copy to the TLC first. Also in this case, necessary data read processing can be executed by sequentially executing phase 1 and phase 4.

Figure 8:
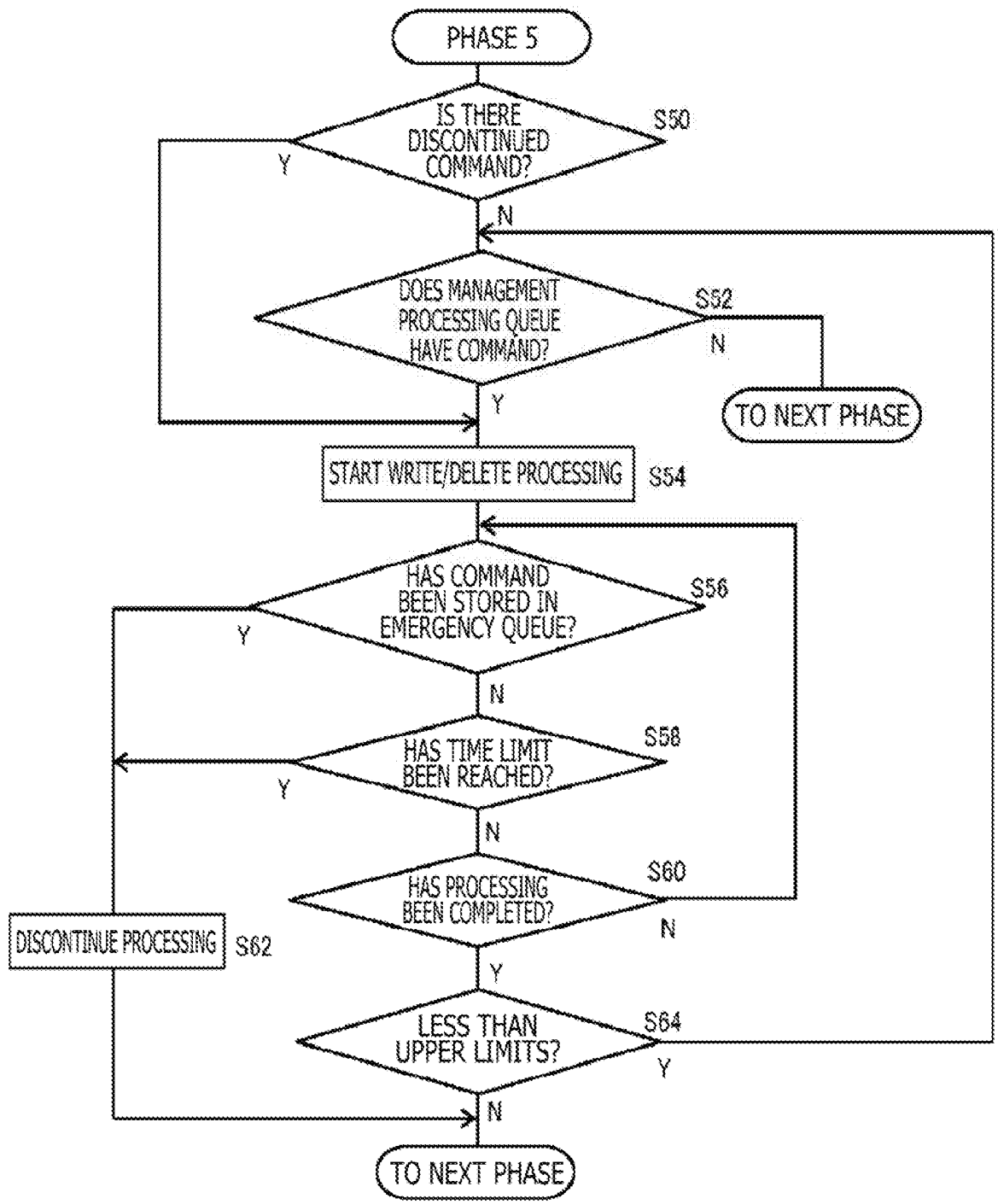
FIG. 8 is a flowchart indicative of a processing procedure in which the command processing block in the present embodiment executes write processing and data deletion among the management processing operations in phase 5.

Referring to FIG. 8, there is illustrated a flowchart indicative of a processing procedure in which the command processing block 46 executes write processing and data delete among the management processing operations in phase 5. It should be noted that the management processing commands that executed only the read processing in phase 3 are left in the queue by making distinction from other commands by flagging or the like. Alternatively, the management processing commands may be stored by sorting into read command, write command, and delete command, thereby deleting the read command processed in phase 3 from the queue.

First, the command processing block 46 checks whether there is any command that discontinued the processing with the timing of preceding phase 5 (S50). Since the processing in phase 5 requires a comparatively long time as described above, the processing is discontinued in a case where commands are stored in the emergency read queue or the time limit of phase 5 has been expired, thereby transitioning to phase 1. The command with the processing discontinued is stored in a queue not illustrated or left in the original queue in a state in which this command is identifiable.

If a discontinued command is found (Y of S50), then the processing is restarted from the point of time at which the command concerned was discontinued (S54). If there is no discontinued command (N of S50), then the command processing block 46 checks whether or not commands are stored in any one of the queues arranged for management processing (S52). It should be noted that the target command here is a command with which only data read has been executed in phase 3. If there is no such a command, the phase concerned is terminated, transitioning to the next phase (N of S52). If such a command is found (Y of S52), then the write processing of the command concerned and the necessary data delete processing are started (S54).

Then, the processing is continued while checking whether commands are not stored in the read queue of the highest emergency for the NSIDb and the time limit set to phase 5 has not been reached (N of S56, N of S58, and N of S60). If either the storage of commands into the emergency queue or the expiration of the time limit occurs (Y of S56 or Y of S58), the started processing is discontinued, transitioning to the next phase (S62). In this case, the transition is made from phase 1 to phase 4 to phase 5 again, thereby restarting the discontinued processing.

If the processing is completed with none of the command storage into the emergency queue and the expiration of the time limit involved (Y of S60), then it is checked whether the number of command processing operations has reached the upper limit; in a case where the number of command processing operations has reached the upper limit, then the phase concerned is terminated, transitioning to the next phase (N of S64). According to the setting of the number of processing upper limits illustrated in FIG. 4, the upper limit of the write in phase 5 is one command, so that the present phase is terminated upon completion of the write processing in S60. In addition, since the data delete processing takes long, the phase is terminated upon completion of the processing.

If, in other settings, the number of processed commands is lower than the upper limit setting of the write processing (Y of S64), then it is checked whether or not commands are stored in each queue; if commands are stored, then these are processed (Y of S52, S54 through S60). In this case, too, if one of the command storage into the emergency queue and the expiration of the time limit occurs (Y of S56 or Y of S58), the started processing is discontinued, transitioning to the next phase (S62). On the other hand, if the processing has been completed with the number of command processing operations reaching the upper limit, then the phase concerned is terminated, transitioning to the next phase (N of S64).

Meanwhile, the frequency of the occurrence of the management processing to be executed in phase 3 and phase 5 is influenced by the number of commands to be executed in phase 1, phase 2, and phase 4. For example, the processing of copying the SLC to the TLC is executed on a three page basis. In a case where the write for one page to the SLC is executed every time in phase 2, copying from the SLC to the TLC once in three intervals can make ends meet. Therefore, the remaining 66% of time can be allocated to another management processing operation.

Further, if one block has 768 pages and the copy of three pages per interval is completed in phase 3 and phase 5, the copy of one block is completed in 256 intervals. In order to avoid read disturb, in a case where the block concerned is copied upon reading of the same block by an average of 1,000,000 times and the read is executed by a maximum of 100 times per interval in phase 1 and phase 4, the necessity for block copy occurs once in 10,000 intervals. Assume that 256 intervals be required for the copy of one block as described above, then the time rate necessary for the management processing for the avoidance of read disturb is a maximum of 256/10000 2.5%.

By considering the causal relation between the number of commands issued from the host unit 12 and the occurrence of management processing so as to set the number of command processing upper limits in each phase with a proper balance as described above, all can be smoothly processed without failing the management processing. In addition, properly switching between the queues subject to processing in each phase in accordance with the processing contents and priority allows the control of the delay time from the issue to the processing of each command.

For example, according to the settings illustrated in FIG. 4, the delay time of the processing of the command stored first in the queue of NSIDb behind another processing operation can be decreased to about 3.0 msec at the maximum that is the time limit of phase 5. Consequently, in a case where a display image is drawn by use of the data read from NSIDb, such troubles as screen freeze and drop can be minimized.

Figure 9:
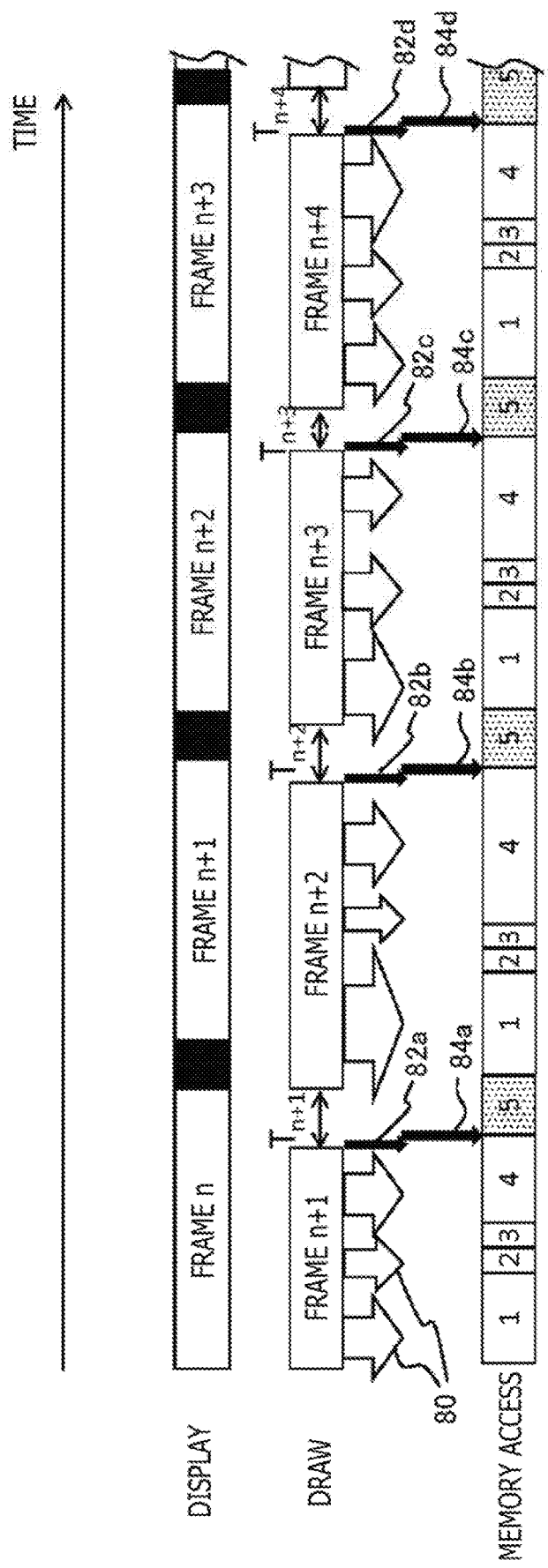
FIG. 9 is a diagram illustrating a mode in which rules for switching between the phases in response to a notification from a host unit are introduced in the present embodiment.

As described so far, in the present embodiment, the switching rules for phases and therefore queues are independently set in accordance with the contents of each commands. Therefore, the rules more complying with the characteristics of information processing can be set to a particular phase. As one example thereof, FIG. 9 illustrates a mode in which the rules for switching between phases in accordance with notifications from the host unit 12 are introduced. In this example, the information processing apparatus repeats the processing of drawing an image to be displayed immediately after by use of the data stored in the flash memory 20 in match with a frame display interval of the display apparatus.

An arrangement in which the data necessary for drawing is read from the flash memory 20 on the spot allows the saving of the capacity of the system memory 14 more than the reading of lots of data in advance. The diagram illustrates, in rectangles from top to bottom, intervals in which frame n, frame n+1, frame n+2, . . . are displayed on the display apparatus, intervals in which each frame is drawn, and each phase of the memory access by the flash controller 18.

The dark interval in the display processing on top correspond to vertical blanking intervals. For such periodic display processing, the information processing apparatus (mainly the host unit 12) is required to complete the drawing of the same frame before displaying is started. Depending on the contents of an image, the drawing interval of each frame and the size and the frequency of request for the data to be read from the flash memory 20 are different. Each white arrow (an arrow 80, for example) downward from the rectangle of a drawing interval is illustrative of the issue timing of a read command from the host unit 12.

As illustrated, in an interval between the completion of the drawing of a certain frame and the start of the drawing of a next frame, there occur free time $T_{n+1}$, $T_{n+2}$, $T_{n+3}$, . . . in accordance with frame drawing intervals. Therefore, collectively executing the processing operations that take time among the management processing operations by use of these times allows the more decreased delay of the read processing in the drawing interval. To be more specific, every time the drawing processing for one frame is completed, a notification thereof is sent from the host unit 12 to the flash controller 18. In this diagram, the notification timings are indicated by arrows 82a, 82b, 82c, and 82d.

Upon the acceptance of the notification concerned, the flash controller 18 transitions from phase 4 to phase 5. In the diagram, the transition timings are indicted by arrows 84a, 84b, 84c, and 84d. Thus, switching between the types of commands to be processed by the flash controller 18 in match with the processing progression situations in the host unit 12 allows the execution of the processing required by the host unit 12 and the processing required by the flash memory 20 itself with the timings suitable for these processing operations.

In the example illustrated in the drawing, the command processing is executed only for phases 1 through 4 in an interval in which a drawing data read command is issued from the host unit 12, namely, a frame drawing interval, so that the delay time of read processing is for only the intervals of phase 2 and phase 3 at most. In a case where the number of processing upper limits as illustrated in FIG. 4 is set, the delay time concerned is a maximum of 0.9 msec.

Figure 10:
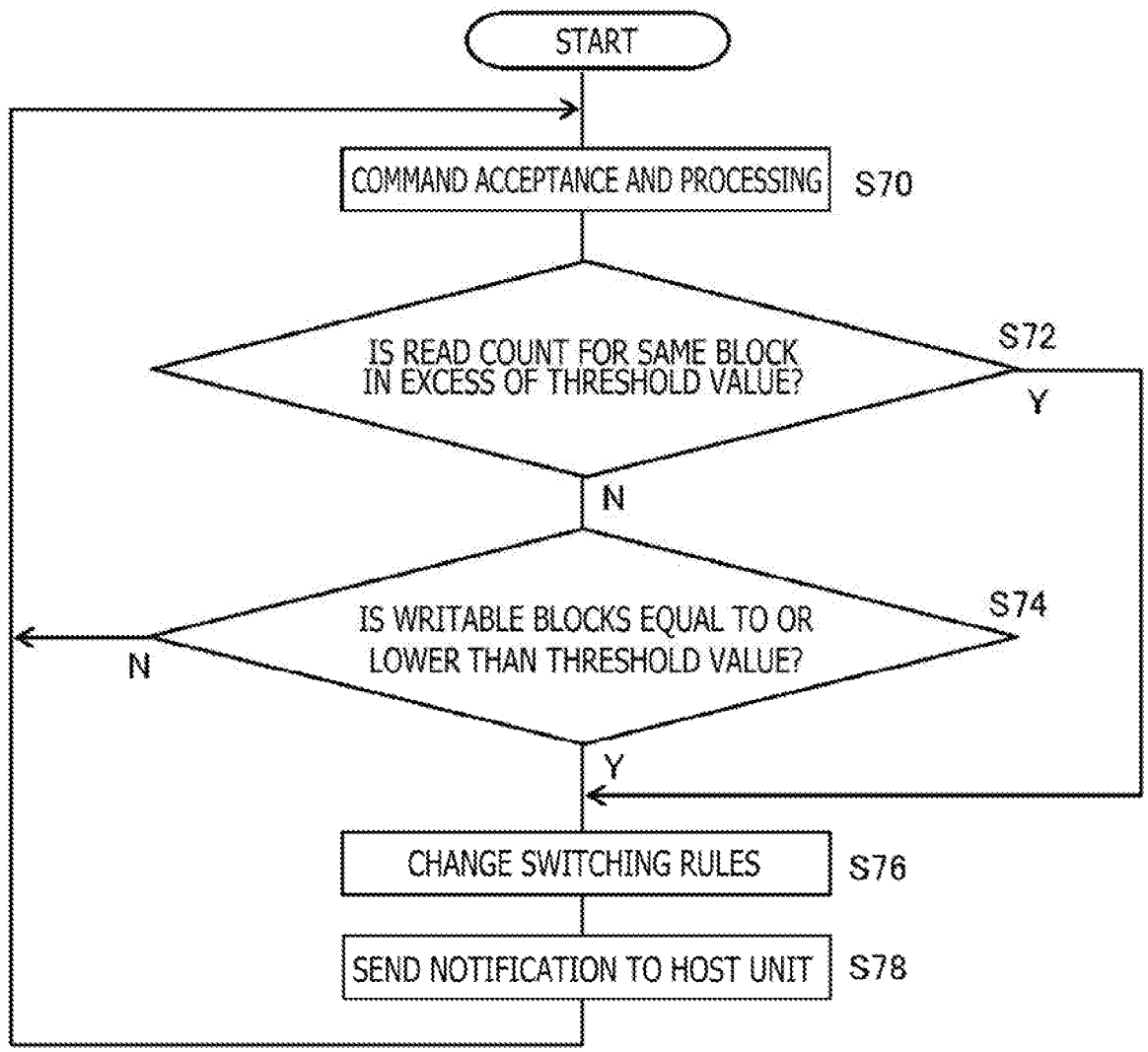
FIG. 10 is a flowchart indicative of a processing procedure a flash controller focused on the adjustment by a command adjusting block of the present embodiment.

Referring to FIG. 10, there is illustrated a flowchart indicative of a processing procedure of the flash controller 18 as focused on the adjustment by the command adjusting block 50. The command accepting block 40, the management command generating block 42, and the command processing block 46 of the flash controller 18 accept the commands issued from the host unit 12 and generates the commands for management processing so as to sequentially execute these commands as described above (S70). As detained above, this step includes the processing of switching between the queues subject to processing in phases 1 through 5 or in each phase in accordance with the rules set to the switching rules storage block 48.

Further, as illustrated in FIG. 9, an operation may be included in which transition is made to phase 5 upon accepting a notification from the host unit 12. Along with such command processing, the command adjusting block 50 monitors whether or not the number of times the same block is read as stored in the flash memory 20 has exceeded a predetermined threshold value (S72). Further, the command adjusting block 50 also monitors whether or not the number of newly writable blocks goes equal to or lower than a predetermined threshold value (S74). The former is for forecasting the arrival of a data copy command issue timing for avoiding read disturb in advance.

The latter is for forecasting the arrival of a garbage collection command issue timing in advance. If both of the monitor results are negative, then the adjustment by the command adjusting block 50 is not executed, thereby continuing the command processing (N of S72, N of S74, S70). If the number of times the same block is read exceeds a predetermined threshold value (Y of S72) or the number of newly writable blocks goes equal to or lower than a predetermined threshold value (Y of S74), then the command adjusting block 50 adjusts any of the switching rules stored in the switching rules storage block 48 (S76).

For example, while, in phase 1, phase 2, and phase 4, the commands stored in a read queue of normal priority or a standard write and read queues are not temporarily processed or the number of processing operations thereof is limited, the number of processing upper limits and the time limit of phase 3 and phase 5 are increased. This setup increases the ratio of the time usable for management processing for one interval.

Further, the command adjusting block 50 notifies the host unit 12 of the information that the number of times the same block was read have exceeded a predetermined threshold value and the number of newly writable blocks has gone equal to or lower than a predetermined threshold value (S78). In response to this notification, the host unit 12 temporarily decreases the number of times the commands are issued for the read processing of normal priority and the standard write and read processing. This setup also increases the ratio of the time usable for management processing for one interval as with the change of switching rules. It should be noted that it is also practicable to notify the host unit 12 of the number of times the same block is read and the number of writable blocks from time to time, thereby adjusting, on the host unit 12 side, the number of times commands are issued.

As a result, while assuring the processing of commands that are high in emergency among the requests from the host unit 12, situations in which correct data read/write processing fails due to delayed management processing can be avoided. It should be noted that only one of the monitoring items of S72 and S74 may be used or other monitoring items that allow the forecast of the necessity of management processing may be used or combined. For example, the necessity of the adjustment may be determined by setting a threshold value to the number of commands actually stored in management processing queues by forecasting the number of stored commands from command storage situations so far.

Further, only one of the change of switching rules in S76 and the notification to the host unit 12 in S78 may be executed. Still further, although the illustration is omitted, upon completion of the management processing targeted by the monitoring items, the command adjusting block 50 returns the switching rules to the original form and return the number of times commands have been issued to the normal state by notifying the host unit of the returning to the original switching rules.

According to the present embodiment described so far, the access requests to a flash memory are stored in different queues according to the processing contents such as read and write and the priorities thereof. Then, by following the rules set to each of the queues, the target queues are switched between to read commands and execute the processing. This arrangement allows the processing of the access requests in a sequence and at a frequency that are suitable for such information processing characteristics as which of data read and data write is more dominant, which is more strict in time constraint conditions, or both are equal therein, for example.

Further, two or more queues are sorted and an interval (phase) is arranged for each type in which processing is executed. This arrangement allows, for each individual queue, the double imposition of the switching rules for the queues to be processed in the same phase and the switching rules between the phases, thereby providing detailed settings by combining these switching rules and, eventually, the flexible operations fit to actual situations.

The queues for such management processing as garbage collection, data copy for read disturb avoidance, and SLC-to-TLC data copy are likewise assembled into the above-mentioned system. This arrangement can prevent the congestion, due to the management processing, of the processing of access requests high in emergency from the host unit. Especially, since the management processing as described above occurs depending on the contents and frequency of access requests from the host unit, setting the rules using absolute indexes for each queue, such as the upper limit of the number of times commands are processed and the time limit thereof can optimize the balance between the both, thereby executing the necessary processing with a low delay without failure. Also, cycling the phases facilitates the estimate of processing intervals, thereby enabling bandwidth control.

Further, some of the management processing described above have unique characteristics of requiring lots of time once the necessity occurs although not frequent. By forecasting the start timing of such processing in advance, the switching rules are temporarily changed or the issue of requests low in emergency by the host unit is held down. This arrangement can easily realize flexible measures such as temporarily increasing the time to be allocated to management processing for promotion, while assuring the minimum necessary access processing for the processing by the host unit.

While preferred embodiments of the present invention have been described using specific terms, such description is for illustrative purpose only, and it is to be understood by those skilled in the art that changes and variations of combinations of the components and the processing procedures may be made without departing from the spirit or scope of the following claims.

REFERENCE SIGNS LIST

10 Information processing apparatus, 12 Host unit, 14 system memory, 18 Flash controller, 20 Flash memory, 22 Host controller, 24 SRAM, 28 Memory controller, 30 Command issuing block, 32 Information processing block, 34 Data input/output block, 36 Queue, 40 Command accepting block, 42 Management command generating block, 44 Queue, 46 Command processing block, 48 Switching rules storage block, 50 Command adjusting block.

INDUSTRIAL APPLICABILITY

As described above, the present invention is applicable to an information processing apparatus and a memory controller that execute memory access processing.

The invention claimed is:

1. An information processing apparatus comprising:
a memory controller including
a command accepting block configured to accept an access request from a host processor to a memory, the access request being stored in a sorted manner in one of a plurality of request queues, each request queue having associated therewith a rule set;
a management command generating block configured to generate a management command for managing the memory, the management command being stored in a sorted manner in one of a plurality of command queues, each command queue having associated therewith a rule set; and
a command processing block configured to read from at least one of the plurality of request queues and the plurality of command queues;
wherein
the command processing block switches, with a timing in accordance with the rule sets associated with the plurality of request queues, the one request queue to another request queue or to another command queue for processing in a same phase or between phases; and
the command processing block switches, with a timing based on the rule sets associated with the plurality of command queues and a management command processing time limit, the command queue to another command queue or another request queue.

2. The information processing apparatus according to claim 1, wherein
the plurality of request queues store the access request sorted by contents and priority of an access and sorted by contents of the access, and
the command processing block switches at a point at which a processing upper limit number or limit time set independently is reached.

3. The information processing apparatus according to claim 2, wherein the command processing block switches with a timing in accordance with a rule set by the priority of this access.

4. The information processing apparatus according to claim 1, wherein
at least one of the plurality of request queues and the plurality of command queues further include a given queue for storing a request for management processing issued by the management command generating block; and
the command processing block reads and further executes the request for management processing from the given queue.

5. The information processing apparatus according to claim 4, wherein while the given queue in which to store the request for management processing is the read destination, the command processing block switches with a timing of passing of a time limit setting.

6. The information processing apparatus according to claim 4, wherein while the given queue in which to store the request for management processing is the read destination, the command processing block switches with a timing of storing an access request having a predetermined priority into the another request queue or the another command queue.

7. The information processing apparatus according to claim 4, wherein the command processing block sets the request for management processing with a timing of notification by the host processor.

8. The information processing apparatus according to claim 4, wherein the command processing block separates, of the management processing, an interval in which a read processing request is read from an interval in which a write processing request is read.

9. The information processing apparatus according to claim 4, wherein the management processing includes processing of saving data stored in a block to another block and then deleting the data of the original block.

10. The information processing apparatus according to claim 4, wherein the management processing includes processing of copying data written to a single level cell region for recording one bit per memory cell to a triple level cell region for recording three bits per memory cell.

11. The information processing apparatus according to claim 4, wherein the memory controller further includes a command adjusting block configured to change at least any one of rules set for the given queue and a limit of processing on a basis of at least one of a request amount of the management processing already stored in the given queue and forecast results of a timing with which the request of management processing is issued.

12. The information processing apparatus according to claim 4, wherein the memory controller further includes a command adjusting block configured to request the host processor to control issue of an access request on the basis of at least one of a request amount of the management processing already stored in the given queue and forecast results of a timing with which the request of management processing is issued.

13. The information processing apparatus according to claim 1, wherein from a queue collectively storing read requests having priorities higher than a predetermined standard, the command processing block sequentially reads and executes these read requests.

14. The information processing apparatus according to claim 1, further comprising a NAND-type flash memory configured to store data to be requested for access from the host processor.

15. The information processing apparatus according to claim 1, further comprising a host processor configured to execute information processing so as to issue, to the memory controller, the access request.

16. A method to be carried out by a memory controller, the method comprising:
  accepting an access request from a host processor to a memory, the access request being stored in a sorted manner in one of a plurality of request queues, each request queue having associated therewith a rule set;
  generating a management command for managing the memory, the management command being stored in a sorted manner in one of a plurality of command queues, each command queue having associated therewith a rule set; and
  reading from at least one of the plurality of request queues and the plurality of command queues;
  wherein
  the reading switches, with a timing in accordance with the rule sets associated with the plurality of request queues, the one request queue to another request queue or to another command queue for processing in a same phase or between phases; and switches, with a timing based on the rule sets associated with the plurality of command queues and a management command processing time limit, the command queue to another command queue or another request queue.

17. A non-transitory, computer readable storage medium containing a computer program, configured to be executed by a computer, which causes the computer to carry out actions in conjunction with a memory controller, comprising:
  accepting an access request from a host processor to a memory, the access request being stored in a sorted manner in one of a plurality of request queues, each request queue having associated therewith a rule set;
  generating a management command for managing the memory, the management command being stored in a sorted manner in one of a plurality of command queues, each command queue having associated therewith a rule set; and reading from at least one of the plurality of request queues and the plurality of command queues;
  wherein
  the reading switches, with a timing in accordance with the rule sets associated with the plurality of request queues, the one request queue to another request queue or to another command queue for processing in a same phase or between phases; and switches, with a timing based on the rule sets associated with the plurality of command queues and a management command processing time limit, the command queue to another command queue or another request queue.

* * * * *